(12) United States Patent
Sakamoto et al.

(10) Patent No.: US 7,201,488 B2
(45) Date of Patent: Apr. 10, 2007

(54) PLANAR LIGHT SOURCE APPARATUS AND LIQUID DISPLAY APPARATUS

(75) Inventors: Takuya Sakamoto, Kikuchi-gun (JP);
Seiji Sakai, Kikuchi-gun (JP);
Toshiyuki Yoneda, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 250 days.

(21) Appl. No.: 11/051,337

(22) Filed: Feb. 7, 2005

(65) Prior Publication Data

US 2005/0185394 A1    Aug. 25, 2005

(30) Foreign Application Priority Data

Feb. 24, 2004   (JP) .............................. 2004-047716

(51) Int. Cl.
*F21V 33/00* (2006.01)
*A47B 23/06* (2006.01)

(52) U.S. Cl. ...................... 362/133; 362/555; 362/561; 362/633

(58) Field of Classification Search ................ 362/133, 362/555, 560, 561, 608, 609, 610, 612, 613, 362/632, 633, 634

See application file for complete search history.

(56) References Cited

U.S. PATENT DOCUMENTS

| 5,883,684 | A | * | 3/1999 | Millikan et al. | ............... 349/65 |
| 6,134,092 | A | * | 10/2000 | Pelka et al. | .................... 361/31 |
| 6,840,646 | B2 | * | 1/2005 | Cornelissen et al. | ........ 362/606 |

FOREIGN PATENT DOCUMENTS

| JP | 2002-229022 | 8/2002 |
| JP | 2003-076287 | 3/2003 |

* cited by examiner

*Primary Examiner*—John Anthony Ward
(74) *Attorney, Agent, or Firm*—Buchanan Ingersoll & Rooney PC

(57) ABSTRACT

A planar light source including a diffusing plate provided at an opening portion of a cabinet, a plurality of point light sources provided along a hollow region formed on a rear face side of the diffusing plate, a reflecting plate provided at inside of a cabinet relative to the diffusing plate by interposing the hollow region therebetween and arranging an end portion thereof on a side of the point light source to be inclined to a front side, and a flexible board provided with a wiring pattern for supplying power to the respective point light sources, in which an end portion of the flexible board is constituted to be arranged at inside of the cabinet by being flexed to a back side of the end portion of the reflecting plate.

12 Claims, 13 Drawing Sheets

PLANAR LIGHT SOURCE APPARATUS AND LIQUID DISPLAY APPARATUS

BACKGROUND OF THE INVENTION

1. Field of the Invention

The present invention relates to a planar source apparatus and a liquid display apparatus, further in details, relates to an improvement in a planar light source apparatus for diffusing light of a point light source provided along a hollow region formed on a rear face side of a diffusing plate at inside of the hollow region and irradiating the diffused light to a rear face of a liquid crystal panel or the like.

2. Description of the Related Art

There are a side light of type and an immediate downward type of planar light source apparatus for irradiating a display screen from a rear face thereof by irradiating light to a rear face of a liquid crystal panel. According to a planar light source apparatus of a side light type (also refers to as edge light type), a light source is arranged at a side face of a cabinet, and according to a planar light source of an immediate downward type, a light source is arranged on a rear face of a cabinet to be opposed to a liquid crystal panel. Further, there is a planar light source apparatus of a side light type using a light guide plate for guiding light from a light source to an opening portion of a cabinet. According to a planar light source apparatus using a light guide plate, light emitted from a side light portion comprising a line light source of a cold cathode fluorescent lamp (CCFL), a light emitting diode (LED) or the like is reflected at inside of a light guide plate and diffused by a diffusing pattern provided at inside of the light guide plate to thereby take out light planarly from an opening portion.

Generally, according to a planar light source apparatus using a point light source of LED or the like as a light emitting element, when a brightness of a display screen is intended to increase, it is conceivable to increase a density of a number of elements by increasing a number of light emitting elements, or increasing current supplied to respective point light sources. However, in either of the cases, a temperature of a surrounding portion of the point light source is elevated by heat generated from each point light source in accordance with emission of light.

Hence, there is proposed a planar light source apparatus provided with heat radiating means at a board attached with a point light source (for example, Patent References 1 and 2). According to the planar light source apparatus, heat radiating performance can be promoted and therefore, a density of a number of elements of point light sources and current supplied to respective point light sources can be increased. However, in such a planar light source apparatus of a prior art, a light guide plate is used and therefore, there poses a problem that light-weighted formation and thin-size formation of the planar light source apparatus are not facilitated.

Generally, a wiring pattern provided on a board for supplying power to respective point light sources is constituted by combining series connection and parallel connection since when electricity feed lines to point light sources are constituted only by series connection, a voltage applied to a light source unit becomes high. Therefore, when a number of elements of the point light sources is increased, the wiring pattern on the board is complicated, an area of the board is increased and therefore, there also poses a problem that a side light portion is large-sized.

[Patent Reference 1] JP-A-2002-229022
[Patent Reference 2] JP-A-2003-76287

As described above, according to the planar light source apparatus of the prior art, the light guide plate is used and therefore, there poses a problem that light-weighted formation and thin-size formation of the apparatus are not facilitated. Further, when the number of elements of the point light sources is increased, the wiring pattern on the board is complicated, the area of the board is increased and therefore, there poses a problem that the side light portion is large-sized.

SUMMARY OF THE INVENTION

The invention has been carried out in view of the above-described situation, and it is an object thereof to provide a planar light source apparatus and a liquid crystal display apparatus capable of realizing light-weighted formation and thin-size formation of the apparatus without deteriorating performance of radiating heat radiated from a point light source. Particularly, it is an object of the invention to provide a planar light source apparatus capable of downsizing and thinning the apparatus without enlarging a side light portion even when a number of elements of point light sources is increased.

A planar light source apparatus according to the invention is constituted to comprise a diffusing plate provided at an opening portion of a cabinet, a plurality of point light sources provided along a hollow region formed on a side of a rear face of the diffusing plate, a reflecting plate provided at inside of the cabinet by interposing the hollow region relative to the diffusing plate and arranging an end portion thereof on a side of the point light source to be inclined to a front side, and a flexible board provided with a wiring pattern for supplying power to the respective point light sources, wherein the flexible board is arranged at inside of the cabinet by flexing a portion thereof to a back side of an end portion of the reflecting plate.

According to such a constitution, the portion of the flexible board is flexed to the back side of the end portion of the reflecting plate inclined to the front side and therefore, even when the wiring pattern on the flexible board is complicated and an area of the board is increased, a side light portion can be restrained from being enlarged.

The planar light source apparatus according to the invention is constituted to further comprise a heat conducting plate for conducting heat produced in accordance with light emittance of the point light source to the cabinet, wherein the conducting plate is smaller than the flexible board and provided on a side of the point light source of the flexible board, and wherein the flexible board is arranged at a rear face of the cabinet by interposing the heat conducting plate therebetween in addition to the above-described constitution. According to such a constitution, heat produced in accordance with light emittance of the respective point light sources is conducted to the cabinet via the heat conducing plate to radiate and therefore, a temperature of a peripheral portion of the point light source can be restrained from being elevated. At that occasion, the heat conducting plate is provided on a side of the point light source of the flexible board and the flexible board is arranged on the back side of the cabinet via the heat conducting plate and therefore, the flexible board can effectively be flexed to the back side of the reflecting plate.

Further, the planar light source apparatus according to the invention is constituted such that an end portion of the flexible board is drawn out from a draw out hole for drawing out the board provided at a rear face of the cabinet to a side of a rear face thereof in addition to the above-described constitution. According to such a constitution, the end portion of the flexible board is drawn out from the draw out hole to the back side of the cabinet and therefore, even when the wiring pattern on the board is complicated and the area of the board is increased, the side light portion can effectively be restrained from being enlarged. At that occasion, current can be supplied to a light source unit from a side of the rear face of the cabinet via an end portion of the flexible board drawn out from the draw out hole.

Further, the planar light source apparatus according to the invention is constituted by comprising a refracting device for refracting light from the point light source to a side of the reflecting plate to emit to the hollow region in addition to the above-described constitution. According to such a constitution, light from the point light source is refracted to the side of the reflecting plate by the refracting device to emit to the hollow region and therefore, an amount of light reflected by the reflecting plate can be increased and a path of propagating light propagating in the hollow region can be prolonged. Therefore, light emitted from the side light portion can be taken out from the opening portion by being sufficiently reflected and diffused at inside of the hollow region and therefore, it can be restrained that a vicinity of the side light portion of the opening portion becomes excessively bright. Thereby, planar uniform light can be taken out from the opening portion and therefore, light-weighted formation and thin-size formation of the planar light source apparatus can be achieved.

A liquid crystal display apparatus according to the invention is a liquid crystal display apparatus including a liquid crystal panel, and a planar light source apparatus for irradiating light to a rear face of the liquid crystal panel, the planar light source apparatus comprising a diffusing plate provided at an opening portion of a cabinet, a plurality of point light sources provided along a hollow region formed on a side of a rear face of the diffusing plate, a reflecting plate provided at inside of the cabinet by interposing the hollow region relative to the diffusing plate and arranging an end portion thereof on a side of the point light source to be inclined to a front side, and a flexible board provided with a wiring pattern for supplying power to the respective point light sources, wherein the flexible board is arranged at inside of the cabinet by flexing a portion thereof to a back side of an end portion of the reflecting plate.

According to the planar light source apparatus and the liquid crystal display apparatus of the invention, the portion of the flexible board is flexed to the back side of the end portion of the reflecting plate inclined to the front side and therefore, even when the wiring pattern on the flexible board is complicated and an area of the board is increased, the side light portion can be restrained from being enlarged. Therefore, small-sized formation and thin-size formation of the planar light source apparatus can be achieved. Further, heat produced in accordance with light emittance of the respective point light sources is conducted to the cabinet via the heat conducting plate to radiate and therefore, a temperature of a peripheral portion of the point light source can be restrained from being elevated, light from the point light source is refracted to the side of the reflecting plate by the refracting device to emit to the hollow region and therefore, it can be restrained that a vicinity of the side light portion of the opening portion becomes excessively bright. Therefore, planar uniform light can be taken out from the opening portion without using the light guide plate and light-weighted formation and thin-size formation of the planar light source apparatus can be achieved.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Embodiment 1

Figure 1:
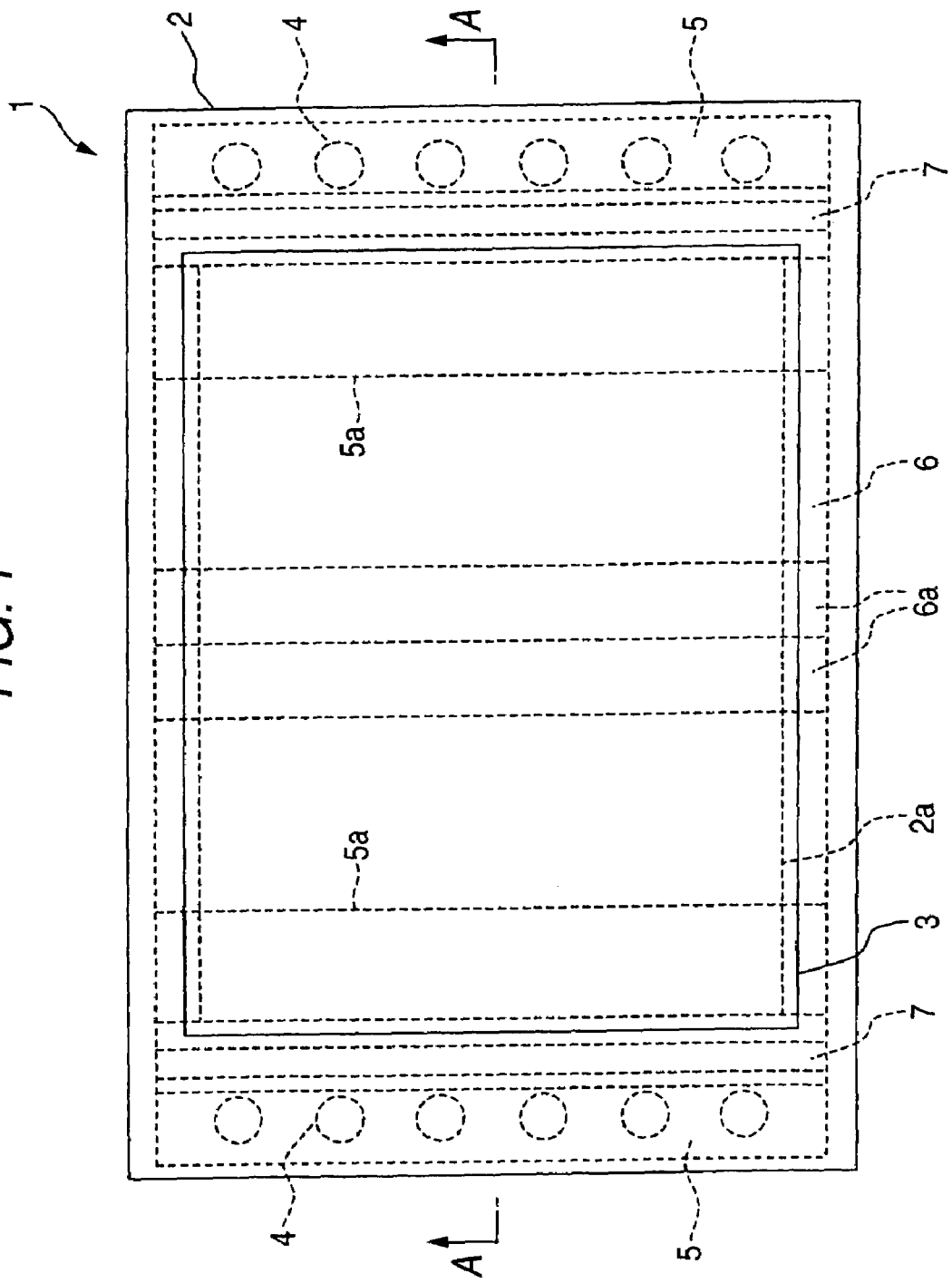
FIG. 1 is a view showing an example of an outline constitution of a planar light source apparatus according to Embodiment 1 of the invention.
Figure 2:
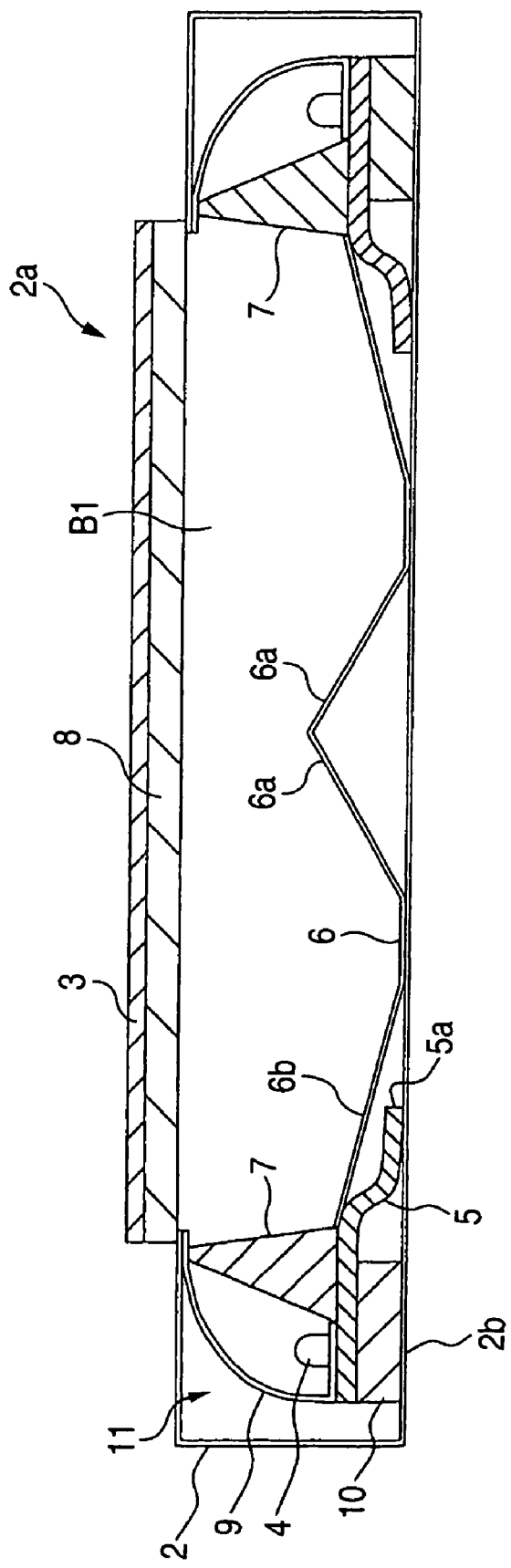
FIG. 2 is a view showing an example of an outline constitution of the planar light source apparatus according to Embodiment 1 of the invention.

FIG. 1 and FIG. 2 are views showing an example of an outline constitution of a planar light source apparatus according to Embodiment 1 of the invention, FIG. 1 shows a plane view and FIG. 2 shows a sectional view cut by a line A—A of FIG. 1. A planar light source apparatus 1 according to the invention is a light source apparatus capable of taking out a planar irradiated light uniformly from an opening portion 2a at a front face of a cabinet 2, and one end 5a of a flexible board 5 provided with a plurality of point light sources 4 is arranged to be flexed to a back side of a reflecting plate 6.

Although use of the planar light source apparatus 1 is not particularly limited, the apparatus is preferable for illuminating a display screen from a rear face by irradiating light to a rear face of a liquid crystal panel (not illustrated). That is, a liquid crystal display apparatus can be constituted by attaching a liquid crystal panel of a transmission type at a front face of the planar light source apparatus 1.

The liquid crystal panel is a display element for displaying a screen by utilizing birefringence of a liquid crystal and is formed by injecting to seal a liquid crystal between a TFT (Thin Film Transistor) array board comprising a thin film transistor and a pixel electrode and an opposed board. Further, a display element other than the liquid crystal panel may be used so far as the display element displays information by modulating the irradiated light from the planar light source apparatus 1. For example, in place of a liquid crystal panel, a display board of a sigh board or the like formed by printing characters or pictures on a transparent plate.

The planar light source apparatus 1 is constituted by the cabinet 2, an optical sheet 3, the point light source 4, the flexible board 5, the reflecting plate 6, a refracting device 7, a diffusing plate 8, a reflector 9, and a heat conducting plate 10. The opening portion 2a is provided at the front face of the cabinet 2 and a hollow region B1 is formed at inside of the cabinet 2. The cabinet 2 prevents light from leaking from other than the opening portion 2a. As a member of constituting the cabinet 2, a resin or a metal is used from a standpoint of requested strength or workability. Particularly, when a metal of aluminum or the like is used, heat conductivity can be increased and therefore, the metal is preferable in view of heat radiating performance. Further, it is preferable to form a reflecting film comprising a member having a high reflectance in the cabinet 2.

The diffusing plate 8 is light diffusing means provided at the opening portion 2a for restraining a nonuniformity in brightness or a nonuniformity in color at inside of an opening face of the opening portion 2a. The diffusing plate 8 comprises a member having transparency of a transparent resin, glass or the like, and is formed by mixing a reflecting material, or roughening a surface of the member. The optical sheet 3 comprises various sheet members provided at the front face of the diffusing plate 8. For example, a single sheet or a plurality of sheets, as needed, of a transparent sheet member(s) each formed with a row of prisms for reflecting and refracting light at a surface thereof is (are) used. Further, other than the prism sheet (also referred to as lens sheet), a protecting sheet, a polarizing and reflecting sheet and the like may be combined to use.

The point light source 4 is a light emitting element in a point-like shape attached to the flexible board 5 and is driven by a power source circuit, not illustrated. A plurality of the point light sources 4 are attached onto the flexible board 5 and the respective point light sources 4 are arranged in one row along the flexible board 5. That is, the respective point light sources 4 are arranged at equal intervals along the hollow region B1 formed on the back face side of the diffusing plate 8. Further, the light source units each comprising the point light source 4, the flexible board 5 and the heat conducing plate 10 are arranged on both sides of the cabinet 2.

Each point light source 4 comprises a light emitting diode (LED) for generating single color of light of red color, green color or blue color and is formed by sealing an LED element constituting a light emitting portion by a transparent resin in a shape of a lens. The point light sources 4 of respective colors are arranged by numbers of pieces and an order of arrangement in accordance with aimed brightness or chromaticity.

Here, in order to provide white color as the irradiated light, the respective point light sources 4 are made to be arranged to form colors different from each other from the contiguous point light sources 4. Further, the respective point light sources 4 are made to be driven independently from each other for respective emitted lights. Thereby, adjustment and control with regard to the chromaticity of the irradiated light can be facilitated. Further, in place of using LEDs of red color, green color and blue color, an LED for generating white color may be used as the point light source 4. Further, the laser diode (LD) or EL (Electronic Luminescence) may be used as the point light source 4.

The reflecting plate 6 is light reflecting means provided at a bottom face 2b of the cabinet 2 to be opposed to the opening portion 2a for reflecting light emitted from the respective point light sources 4 to the hollow region B1. That is, the reflecting plate 6 is provided at inside of the cabinet 2 relative to the diffusing plate 8 by interposing the hollow region B1 therebetween. It is preferable to use a metal plate of aluminum or the like, a silver-deposited plate, or a white resin plate having a reflectance equal to or larger than 90% of the reflecting plate 6.

The reflecting plate 6 is formed with a projected portion 6a projected to the front face side at a center portion of the cabinet to constitute a preferable brightness at a center portion of the opening portion 2a. That is, the reflecting plate 6 is arranged to be inclined to a side of the opening portion 2a at the center portion. Further, the reflecting plate 6 is arranged with an end portion 6b on the side of the point light source 4 to be inclined to direct to the front side. That is, a sectional shape of the reflecting plate 6 constitutes a W-like shape orthogonal to a direction of aligning the point light sources 4. Thereby, light emitted from the light source unit to the hollow portion B1 can effectively be reflected and therefore, brightness of a vicinity of the light source unit at the opening portion 2a can be reduced and brightness at the center portion in the opening portion 2a can be increased. Therefore, a desired brightness distribution can be provided at the opening portion 2a with regard to the direction orthogonal to the direction of aligning the respective point light sources 4.

The reflector 9 is light reflecting means provided to incorporate the light emitting portion of the row of the point light sources 4 for reflecting light from the point light sources 4 to the hollow region B1. An end portion of the reflector 9 is provided with a plurality of through holes for inserting the point light sources 4 and the respective point light sources 4 are arranged via the through holes. That is, a sectional shape of the reflector 9 orthogonal to the direction of aligning the row of the point light sources 4 is constituted by a channel-like shape. Further, a member comprising a metal plate formed with a reflecting layer comprising a metal of silver, aluminum or the like or a sheet made of a white resin is used for the reflector 9.

Here, a side light portion 11 is formed from the light source unit and the reflector 9. That is, both sides of the cabinet 2 are arranged with the side light portions 11, fluxes of light emitted from the respective side light portion 11 to the hollow region B1 are respectively propagated at inside of the hollow region B1 and the portions thereof are reflected by the reflecting plate 6. The fluxes of light are diffused by the diffusing plate 8 and emitted to the front face side.

The refracting device 7 is an optical element arranged between the point light source 4 and the hollow region B1 along the direction of aligning the point light sources 4 for refracting light from the point light source 4 to the side of the reflecting plate 6 to emit to the hollow region B1. The refracting device 7 comprises a member of a transparent resin of acrylic resin or polycarbonate and a columnar member in a prism-like shape a sectional shape of which is a quadrangle can be used therefor.

By using such a refracting device 7, an amount of light reflected by the reflecting plate 6 is increased and therefore, a path of propagating light propagated at inside of the hollow region B1 is prolonged to achieve an excellent diffusing effect. Therefore, it can be prevented that the vicinity of the side light portion 11 becomes excessively bright in the opening portion 2a. The refracting device 7 preferably refracts light having an angle of incidence maximizing intensity in light incident on an incident face and particularly emits the incident light to the reflecting plate 6. Thereby, a further excellent diffusing effect can be achieved.

The flexible board 5 is a film board provided with the wiring pattern for supplying power to the respective point light sources 4 and a portion thereof is arranged at inside of the cabinet 2 by being flexed to the back side of the end portion 6b of the reflecting plate 6. That is, the end portion 5a on a side opposed to a side of arranging the respective point light sources 4 on the flexible board 5 is flexed into a clearance produced between the back face 2b of the cabinet 2 and the end portion 6b of the reflecting plate 6 by inclining the end portion 6b of the reflecting plate 6 to the front side. Further, a flexible resin of polyimide is used for a member constituting the flexible board 5. Further, the member having a thickness equal to or smaller than 0.5 mm is used. By arranging a portion of the flexible board 5 to be flexed to the back side of the end portion 6b of the reflecting plate inclined to the front side, even when the wiring pattern on the flexible board 5 is complicated and an area of the board is increased, the side light portion 11 can be restrained from being enlarged.

The heat conducting plate 10 is heat conducting means provided on the side of the point light source 4 of the flexible board 5 for conducting heat radiated in accordance with light emittance of the point light source 4 to the cabinet 2. The heat conducting plate 10 is smaller than the flexible board 5 and a length thereof in the direction orthogonal to the direction of aligning the respective light sources 4 is made to be shorter than that of the flexible board 5. Further, the heat conducing plate 10 is provided at a face on a side opposed to a face of arranging the respective point light sources 4 in the flexible board 5 and is arranged at the position opposed to the respective point light sources 4. That is, the flexible board 5 is arranged at the back face 2b of the cabinet 2 via the heat conducting plate 10.

A metal plate comprising a member having a high heat conductivity of aluminum, copper or the like is used for the heat conducting plate 10. Further, in place of the metal plate, the member comprising ceramics may be used as the heat conducting plate 10. Further, the heat conducting plate 10 is attached to the cabinet 2 by fastening a screw, or by an adhering agent comprising a member having a high heat conductivity or the like. That is, heat generated at the respective point light sources 4 is conducted to the heat conducting plate 10 via the flexible board 5 to radiate and a portion thereof is conducted to the back face 2b of the cabinet to radiate via the cabinet 2. Heat generated in accordance with light emittance of the respective point light sources 4 is conducted to the cabinet 2 via the heat conducting plate 10 to radiate and therefore, a temperature of peripheral portion of the point light source 4 can be restrained from being elevated. In that occasion, the flexible board 5 can be attached to the back face 2b of the cabinet via the heat conducting plate 10 by providing the heat conducting plate 10 to the side of the point light source 4 of the flexible board 5 and therefore, the flexible board 5 can effectively be flexed to the back side of the reflecting plate 6.

Figure 3:
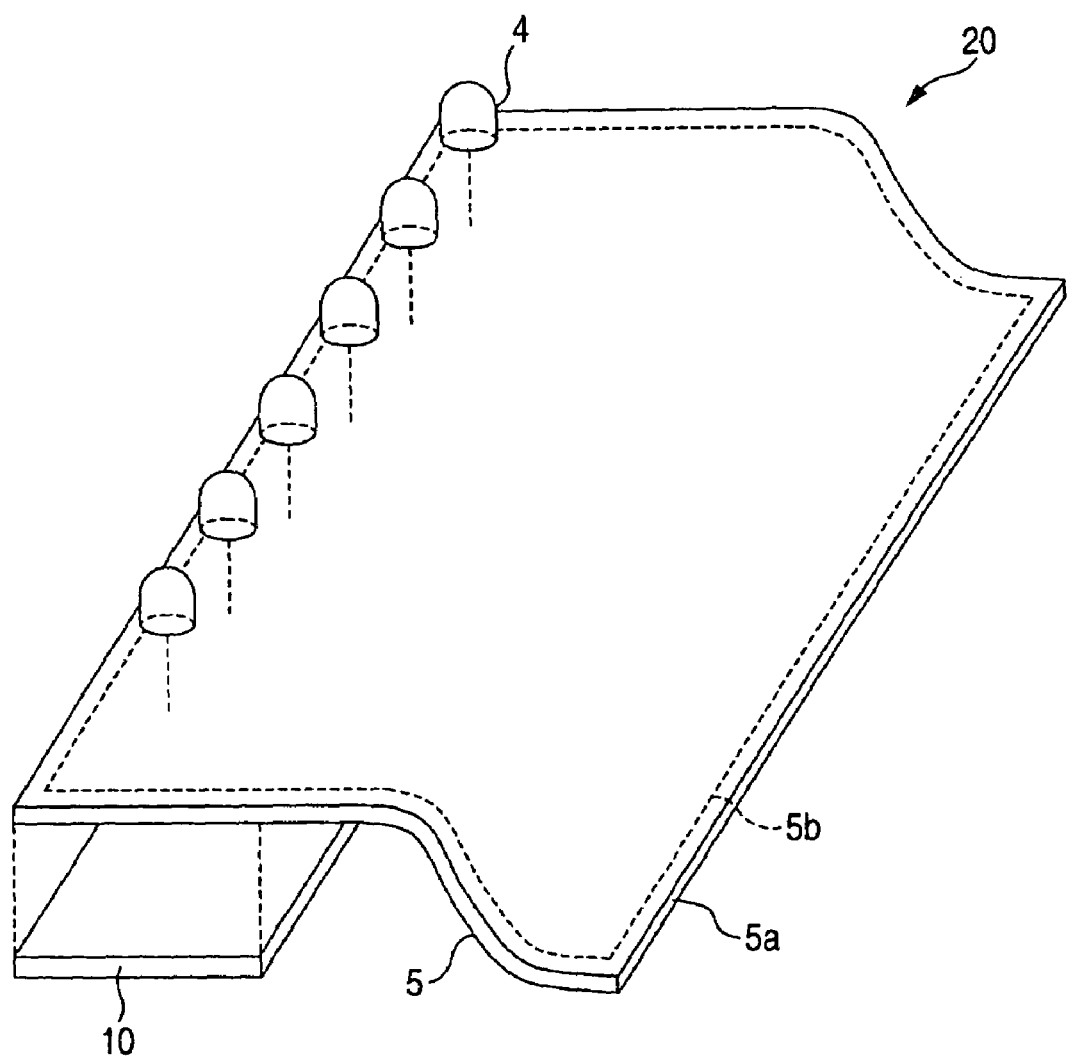
FIG. 3 is a disassembled perspective view showing an example of details of an essential portion in the planar light source apparatus of FIG. 1 and FIG. 2.

FIG. 3 is a disassembled perspective view showing an example of details of an essential portion of the planar light source apparatus of FIG. 1 and FIG. 2 showing a light source unit 20 comprising a plurality of the point light sources 4. According to the flexible board 5, a planar shape thereof becomes a rectangular shape, and a plurality of the point light sources 4 are attached onto the flexible board 5 at equal intervals along a longitudinal direction of the flexible board 5. Further, the conducting plate 10 is attached to a face of the flexible board 5 on a side opposed to a side of attaching the point light sources 4 to be opposed to the respective point light sources 4. Therefore, heat generated at the respective point light sources 4 can effectively be conducted to the heat conducting plate 10.

Further, a pattern forming region 5b comprising a wiring pattern for supplying power to the respective point light sources 4 is formed at a surface of the flexible board 5. When the light source units 20 are arranged on both sides of the back face 2b of the cabinet, the end portions 5a on the sides opposed to the sides of the point light sources 4 on the front face of the flexible board 5 are arranged to be flexed to the back side of the reflecting plates 6. Thereby, the side light portion 11 can be prevented from being enlarged and thin-size formation of the planar light source apparatus 1 can be realized.

Figure 4:
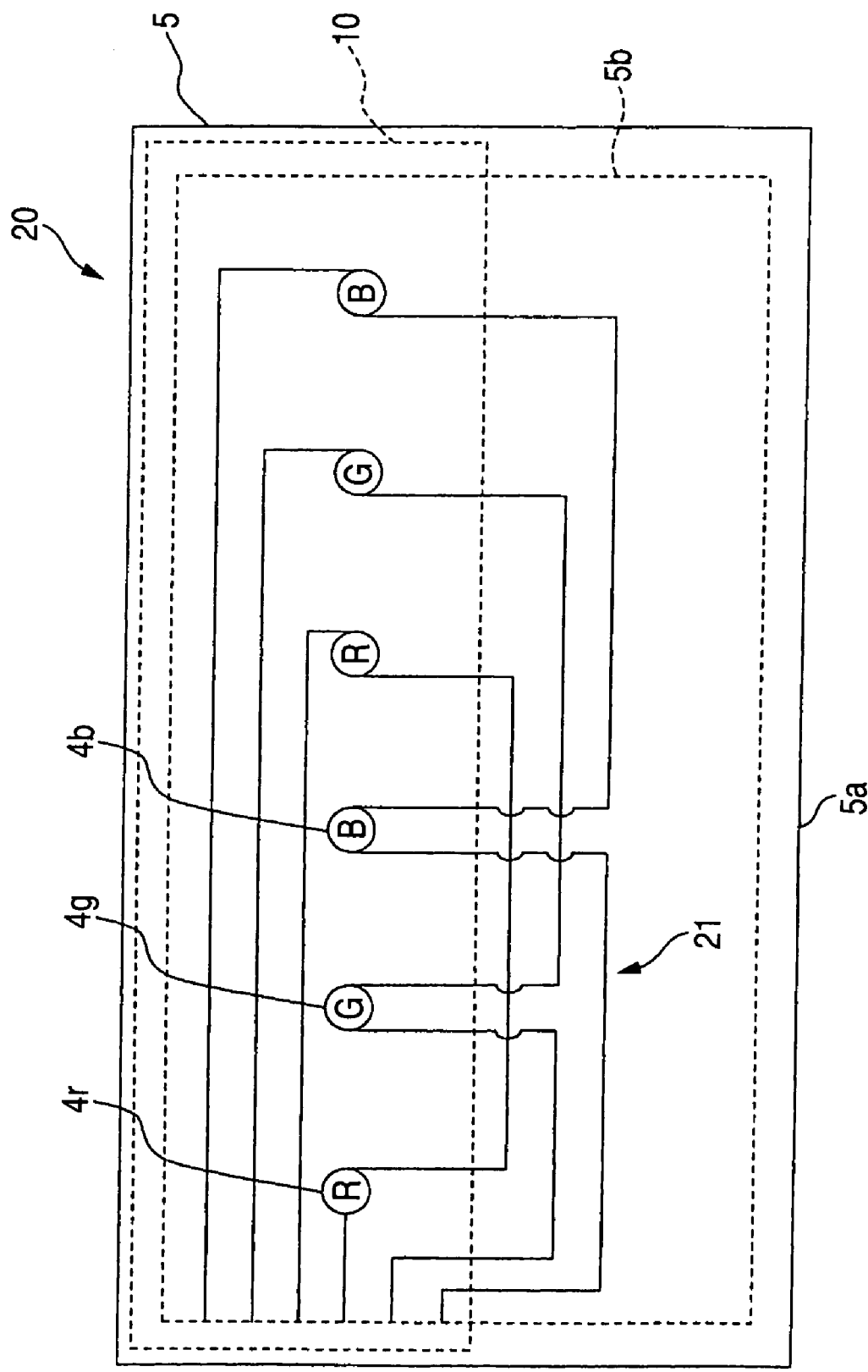
FIG. 4 is a plane view showing an example of details of an essential portion in a light source unit of FIG. 3.

FIG. 4 is a plane view showing an example of details of an essential portion in the light source unit of FIG. 3, showing a wiring pattern 21 formed on the flexible board 5. The point light sources 4 of respective colors are arranged on the flexible board 5 in a predetermined order of alignment. Here, 6 pieces of LEDs are attached thereto in an order of R, G, B of red color (R), green color (G), blue color (B).

The wiring pattern 21 for supplying power to respective LEDS is formed at inside of the pattern forming region 5b. The wiring pattern 21 is constituted to be grouped for respective emitting colors and to be able to supply power for respective groups by connecting in series with the respective point light sources 4 in the same group. That is, the wiring pattern 21 comprises wirings constituting a first group by a group comprising two of red color LEDs 4r, constituting a second group by a group comprising two of green color LEDs 4g and constituting a third group by a group comprising two of blue color LEDS 4b and connecting in series with the respective LEDs in the respective groups, and wirings for supplying power to the respective groups independently from each other.

In this way, the wiring pattern 21 is constituted by combining series connection and parallel connection and therefore, when a number of the point light sources is increased, the wiring pattern is complicated, as a result, an area of the flexible board 5 is increased. That is, a length of the flexible board 5 in a direction orthogonal to the direction of aligning the respective light sources 4 is increased. According to the embodiment, the power source unit 20 is arranged by flexing the end portion 5a formed with an essential portion of the wiring pattern 21 to the back side of the reflecting plate 6 and therefore, the side light portion 11 can be prevented from being enlarged and the planar light source apparatus 1 can be thinned.

Figure 5:
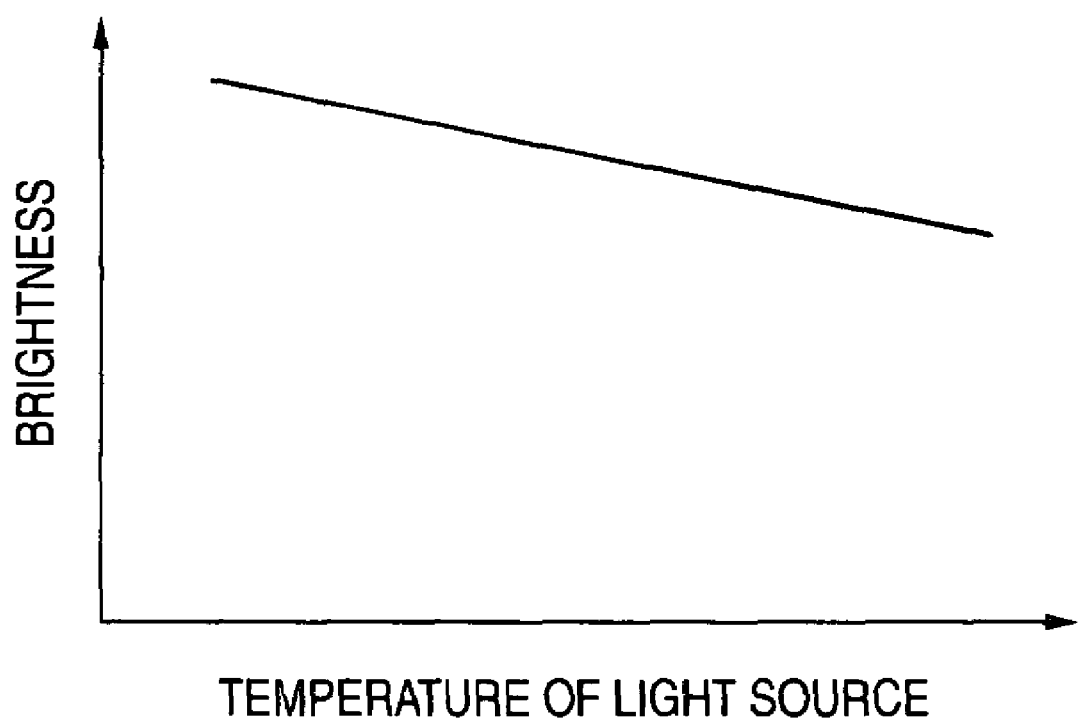
FIG. 5 is a diagram showing an example of a brightness characteristic of the planar light source apparatus of FIG. 1 and FIG. 2.

FIG. 5 is a diagram showing an example of a brightness characteristic in the planar light source apparatus of FIG. 1 and FIG. 2, showing a behavior of uniformly reducing a brightness at the opening portion 2a in accordance with temperature rise at a peripheral portion of the point light source 4. Generally, a light emitting efficiency of LED is deteriorated by temperature rise. Therefore, when the temperature at the peripheral portion of the point light source 4 rises, a brightness level at the opening portion 2a is lowered. According to the embodiment, heat generated at LED is conducted to the heat conducting plate 10 via the flexible board 5 and is effectively radiated by the cabinet 2 and therefore, temperature rise at the peripheral portion of the point light source 4 can be restrained. Therefore, the brightness level at the opening portion 2a is restrained from being lowered and a bright display screen can be achieved.

Figure 6:
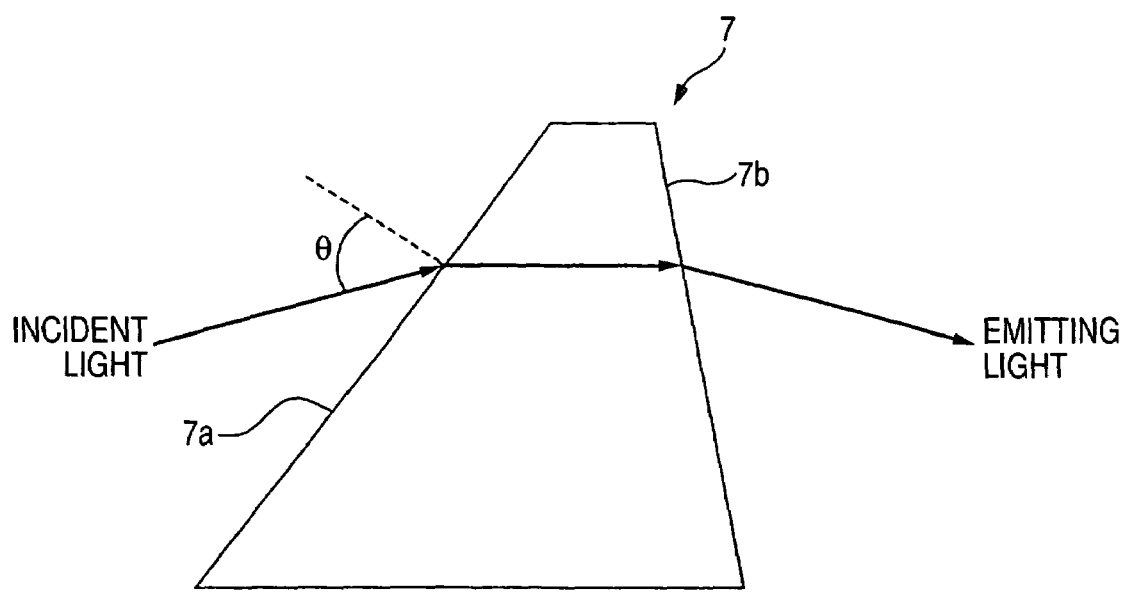
FIG. 6 is a side view showing an example of details of an essential portion of the planar light source apparatus of FIG. 1 and FIG. 2.

FIG. 6 is a side view showing an example of details of an essential portion in the planar light source apparatus of FIG. 1 and FIG. 2 showing a behavior in which light having an angle of incidence of maximizing the intensity is incident on an incident face 7a of the refracting device 7. The refracting device 7 includes the incident face 7a on which light direct from the point light source 4 and light reflected by the reflector 9 are incident, and an emitting face 7b from which refracted light is emitted.

The remoter from the back face 2b of the cabinet, the more inclined is the incident face 7a to the side of the hollow region B1. On the other hand, the remoter from the back face 2b of the cabinet, the more inclined is the emitting face 2b to the side of the point light source 4. Light direct from the respective point light sources 4 and light reflected by the reflector 9 are refracted to the side of the back face 2b of the cabinet, that is, the side of the reflecting plate 6 when they are incident on the incident face 7a. Particularly, light having the angle of incidence of maximizing the intensity in the incident light is refracted to the side of the reflecting plate 6 at the incident face 7a. The refracted light is further refracted at the emitting face 7b and is emitted to the reflecting plate 6. Thereby, light from the point light source 4 can effectively be directed to the reflecting plate 6 and therefore, it can be prevented that a vicinity of the side light portion 11 of the opening portion 2a becomes excessively bright.

According to the embodiment, the end portion 5a of the flexible board 5 is flexed to the back side of the end portion 6b of the reflecting plate and therefore, even when the wiring pattern 21 on the flexible board 5 is complicated and the area of the board is increased, the side light portion 11 can be restrained from being enlarged. Further, heat generated in accordance with light emission of the respective point light sources 4 is conducted to the cabinet 2 via the heat conducting plate 10 to radiate and therefore, the temperature of the peripheral portion of the point light source 4 can be restrained from being elevated. At that occasion, the heat conducting plate 10 is provided to the side of the point light source 4 of the flexible board 5 and the flexible board 5 is arranged at the back face 2b of the cabinet via the heat conducting plate 10 and therefore, the flexible board 5 can effectively be flexed to the back side of the reflecting plate 6. Therefore, not only the planar light source apparatus 1 can be thinned but also the bright display screen can be achieved.

Further, the light source unit 20 has a rigidity by attaching the heat conducting plate 10 to the flexible board 5 and therefore, attachment or exchange (interchange) of the light source unit 20 can be facilitated.

Further, although according to the embodiment, an explanation has been given of an example in the case in which the respective point light sources 4 are attached onto the flexible board 5 and heat generated at the respective point light sources 4 is conducted to the heat conducting plate 10 via the flexible board 5, the invention is not limited thereto. For example, there may be constructed a constitution in which a plurality of through holes penetrating the flexible board 5 and the respective point light sources 4 are arranged to the through holes.

Figure 7:
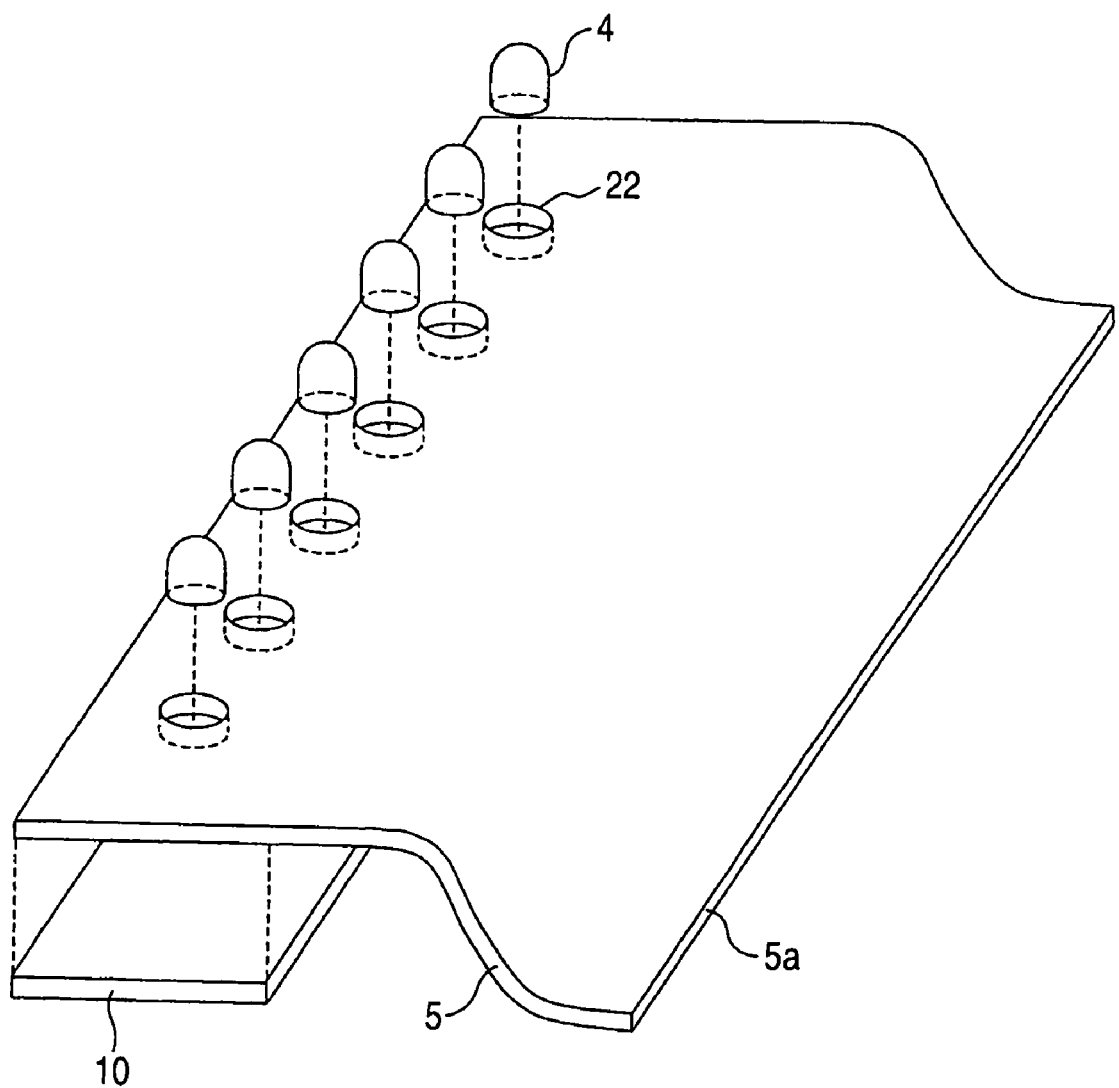
FIG. 7 is a perspective view showing other constitution example of the light source unit of FIG. 3.

FIG. 7 is a perspective view showing other constitution example in the light source unit of FIG. 3 showing the flexible board 5 provided with a plurality of through holes 22. The flexible board 5 are respectively provided with the through holes 22 penetrating the board at positions of arranging the respective point light sources 4. Each through hole 22 has a shape matched to a size of the point light source 4. That is, an opening to a degree the same as that of a section of LED is formed.

The respective point light sources 4 are respectively attached to the heat conducting plate 10 via such through holes 22. That is, the respective point light sources 4 are arranged by bringing bottom faces thereof into contact with a front face of the heat conducting plate 10. According to such a structure, heat generated at the respective point light sources 4 can effectively be conducted to the heat conducting plate 10 and therefore, heat radiating performance can further be promoted. Therefore, a brighter display screen can be achieved.

Further, although according to the embodiment, an explanation has been given of an example of the case in which the wiring pattern 21 is formed by grouping the respective point light sources 4 for respective emitting colors, the invention is not limited thereto. For example, when the respective point light sources comprise LEDs having the same color, the wiring pattern may be formed by grouping the respective light sources 4 at every predetermined number of elements.

Figure 8:
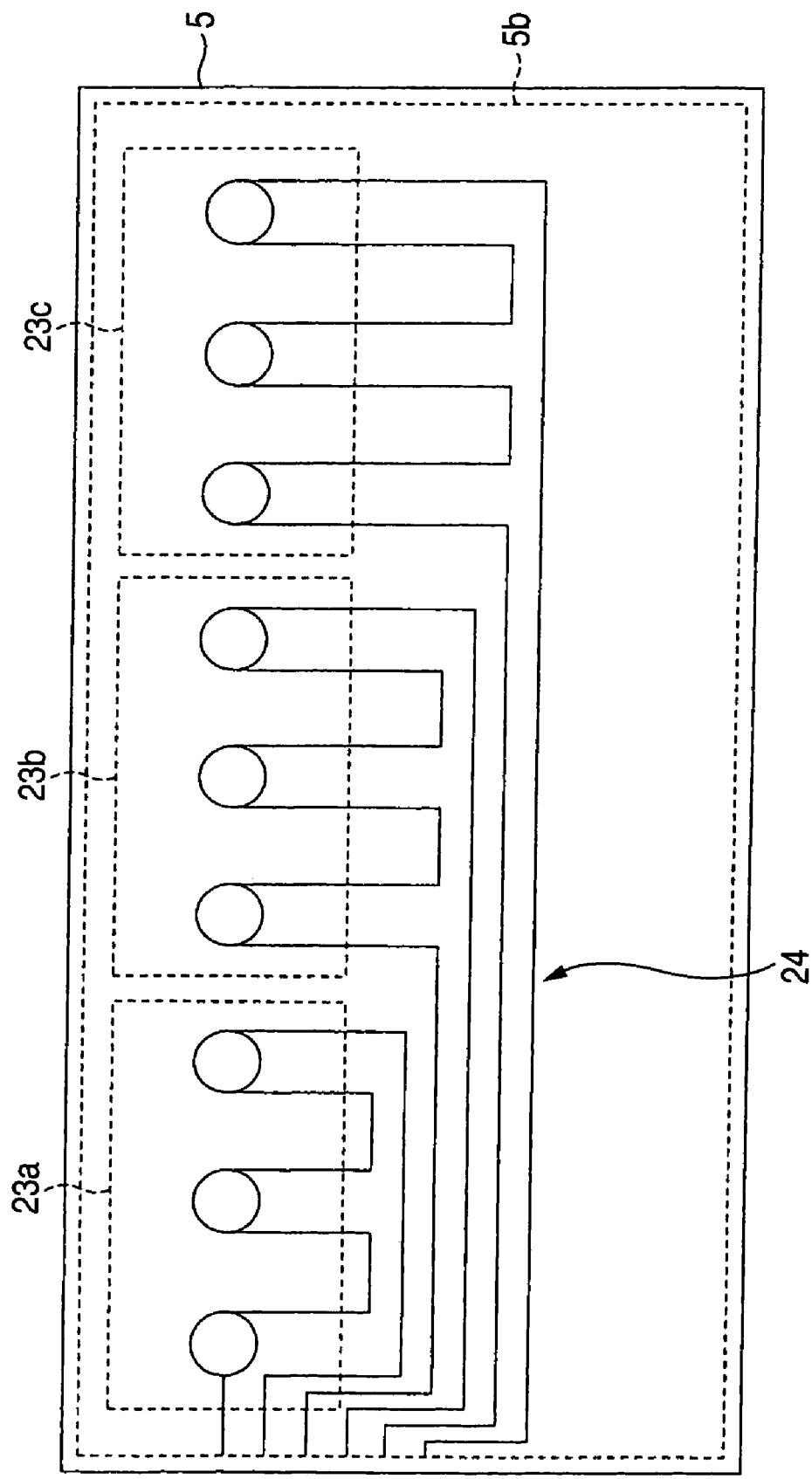
FIG. 8 is a plane view showing other constitution example of the light source unit of FIG. 3.

FIG. 8 is a plane view showing other constitution example of the light source unit of FIG. 3 showing the flexible board 5 formed with a wiring pattern 24 comprising wirings grouping respective LEDS into three groups 23a through 23c and connecting the respective LEDs in series in the groups, and wirings for supplying power to the respective groups 23a through 23c.

For example, when 9 pieces of LEDs having the same emitting color are arranged on the flexible board 5, grouping is carried out successively at every three LEDs. At that occasion, respective LEDs are connected in series in the respective groups 23a through 23c and power is supplied for respective groups 23a through 23c. In such a constitution, the wiring pattern is constituted by combining series connection and parallel connection and therefore, even when a number of the point light sources is increased, wiring can be carried out effectively. Therefore, an increase in the area of the flexible board 5 can effectively be restrained.

Further, although according to the embodiment, an explanation has been given of an example of the case of arranging the end portion 5a of the flexible board 5 to be flexed to the back side of the reflecting plate 6, the invention is not limited thereto. For example, the end portion 5a of the flexible board 5 may be drawn out to the side of the back face from a draw out hole for drawing out the board provided at the back face 2b of the cabinet.

Figure 9:
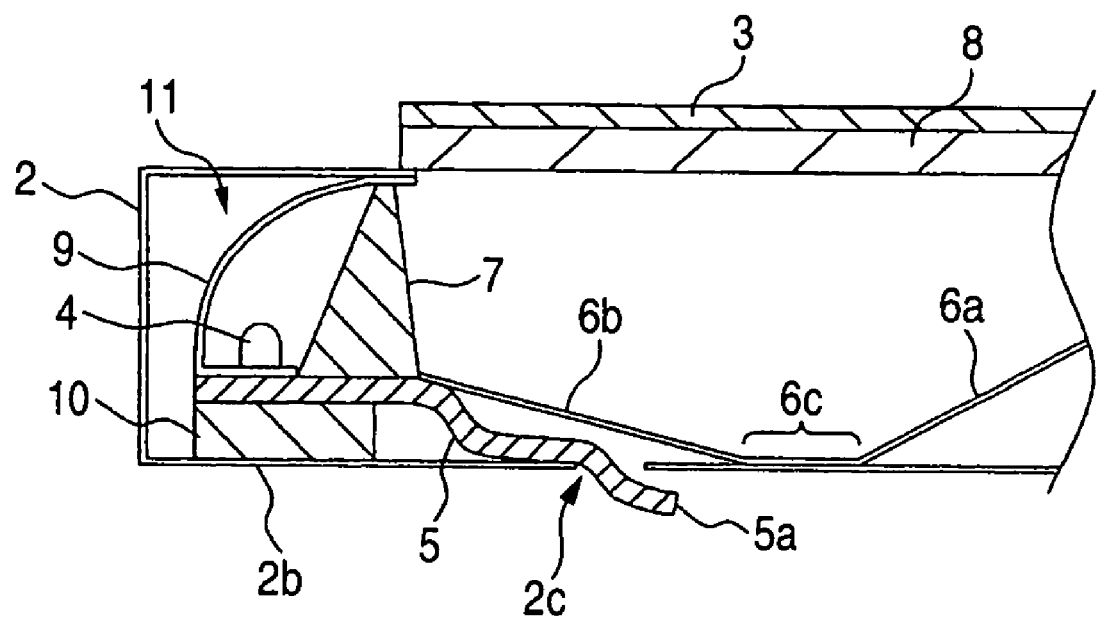
FIG. 9 is a sectional view showing other constitution example of the planar light source apparatus of FIG. 1 and FIG. 2.

FIG. 9 is a sectional view showing other constitution example of the planar light source apparatus of FIG. 1 and FIG. 2 showing a behavior of drawing out the end portion 5a of the flexible board 5 from a draw out hole 2c provided at the back face 2b of the cabinet. According to the planar light source apparatus, the rear face 2b of the cabinet is provided with the draw out hole 2c for drawing out the board and the end portion 5a of the flexible board 5 is drawn out to the back face side via the draw out hole 2c.

Thereby, the flexible board 5 prolonged in the direction orthogonal to the direction of aligning the point light sources 4 can effectively be arranged and therefore, even when the area of the board is increased, the side light portion 11 can effectively be restrained from being enlarged. It is particularly preferable to draw out the end portion 5a of the flexible board 5 at a position before a position 6c at which the reflecting plate 6 becomes the remotest from the opening portion 2a.

Further, although according to the planar light source apparatus of FIG. 9, an explanation has been given of an example of the case in which the end portion 5a of the flexible board 5 is simply drawn out from the draw out hole 2c, the invention is limited thereto. For example, power may be supplied via the end portion 5a of the flexible board 5 drawn out from the draw out hole 2c.

Figure 10:
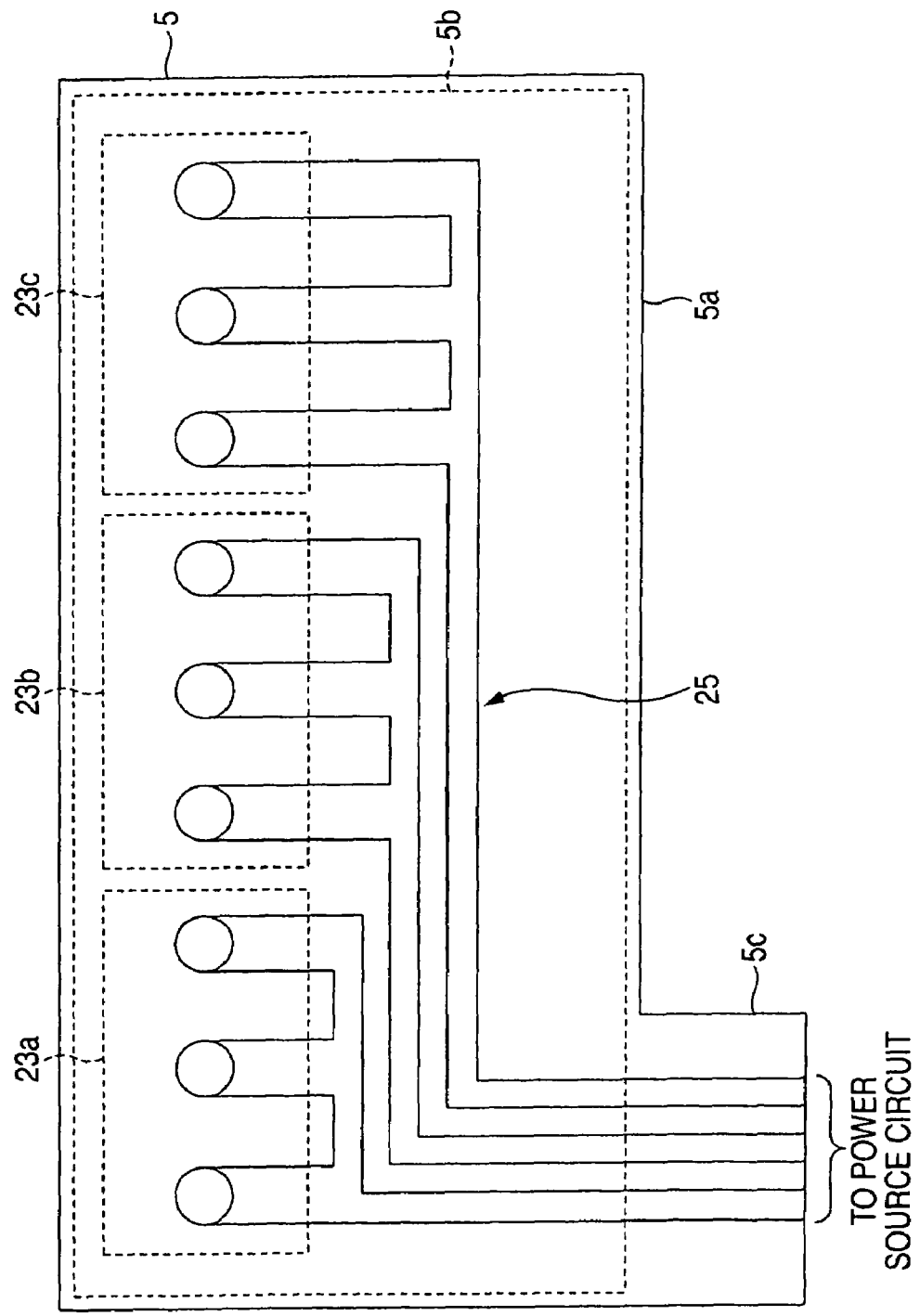
FIG. 10 is a view showing other constitution example of the planar light source apparatus of FIG. 9.
Figure 11:
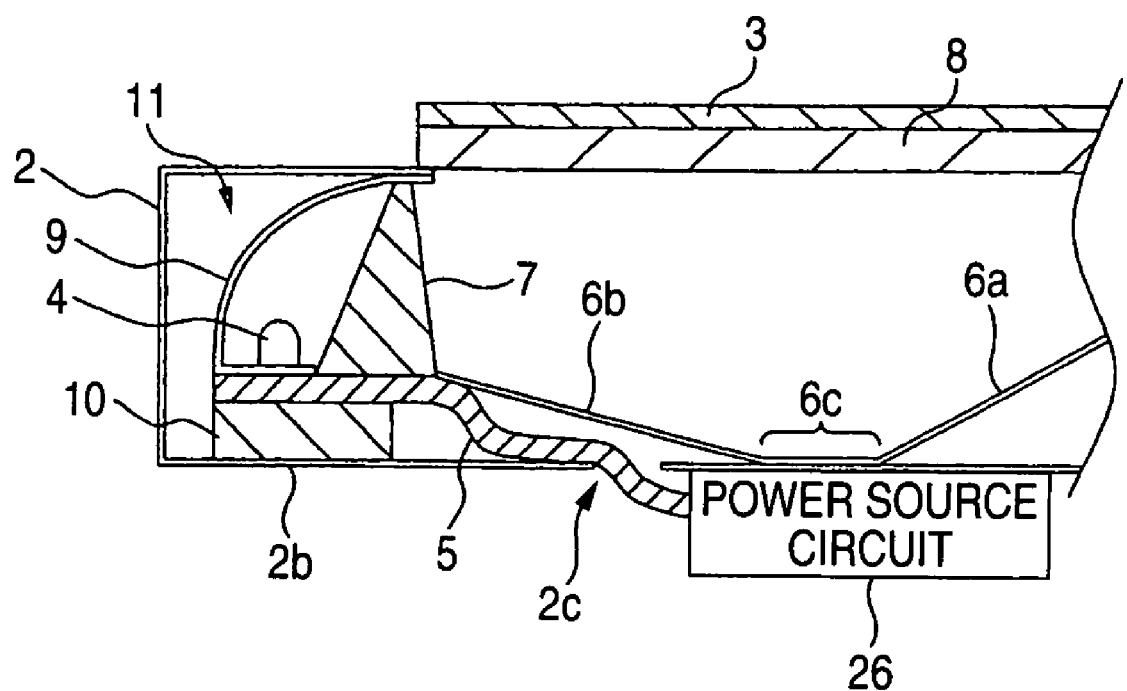
FIG. 11 is a view showing other constitution example of the planar light source apparatus of FIG. 9.

FIG. 10 and FIG. 11 are views showing other constitution example of the planar light source apparatus of FIG. 9, FIG. 10 shows the flexible board 5 in which power is supplied via a projected portion 5c drawn out from the draw out hole 2c and FIG. 11 shows a sectional view of the planar light source apparatus.

According to the planar light source apparatus, power is supplied via the projected portion 5c at the end portion 5a of the flexible board drawn out from the draw out hole 2c of the rear face 2b of the cabinet. That is, power is supplied via the projected portion 5c constituting a portion of the end portion 5a of the board and projected in a direction of drawing out the board. Power is supplied by a power source circuit 26 arranged on the rear face side of the cabinet 2. Further, the power source circuit 26 comprises a driver for driving the respective point light sources 4. According to such a constitution, the flexible board 5 and the power source circuit 26 can pertinently be arranged and therefore, the constitution is further effective for thinning the planar light source apparatus.

Embodiment 2

According to Embodiment 1, an explanation has been given of an example of the case of arranging the respective point light sources 4 at the rear face 2b of the cabinet. In contrast thereto, according to the embodiment, an explanation will be given of a case of arranging the respective point light sources 4 at a side face of the cabinet 2.

Figure 12:
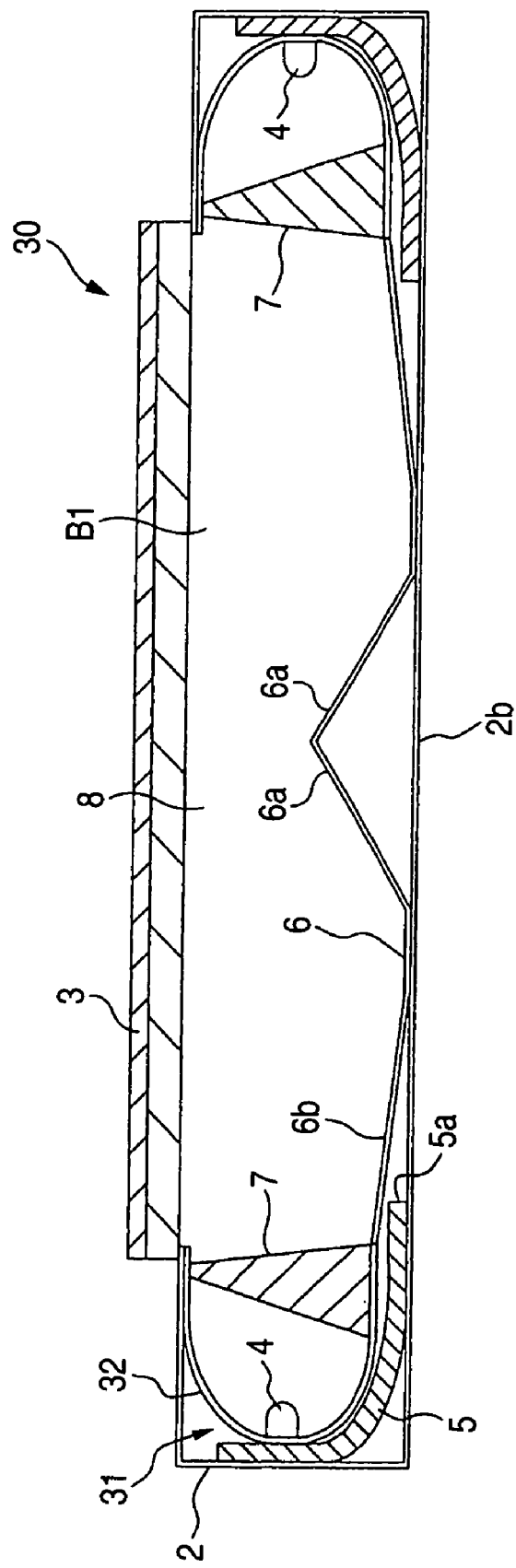
FIG. 12 is a view showing a constitution example of a planar light source apparatus according to Embodiment 2 of the invention.
Figure 13:
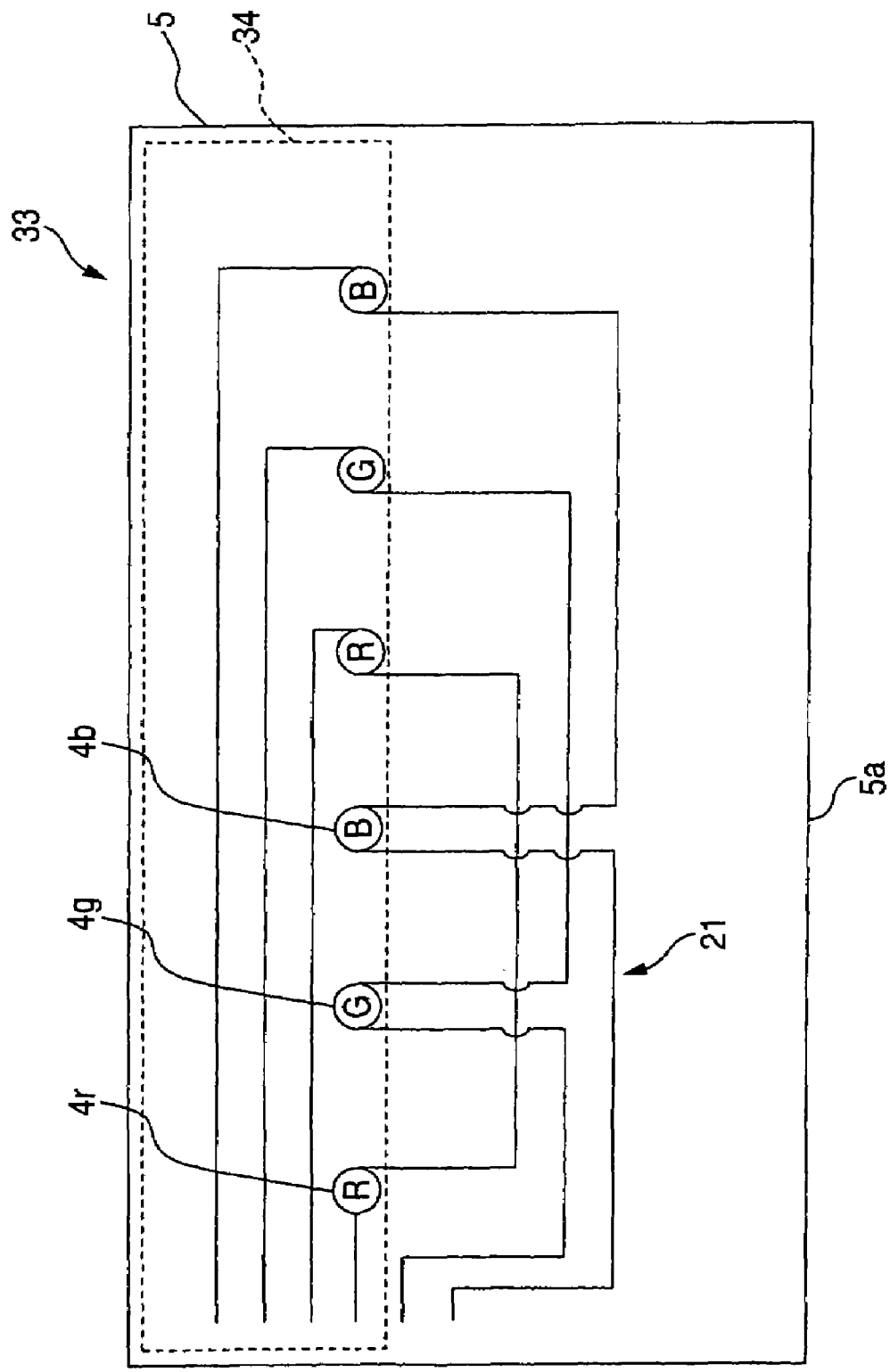
FIG. 13 is a view showing a constitution example of the planar light source apparatus of Embodiment 2 of the invention.

FIG. 12 and FIG. 13 are views showing a constitution example of a planar light source apparatus according to Embodiment 2 of the invention, FIG. 12 shows a sectional view of the planar light source apparatus 30 and FIG. 13 shows the flexible board 5 attached to the side face of the cabinet 2.

In the case of the planar light source apparatus 30 according to the embodiment, the flexible board 5 provided with the respective point light sources 4 are attached to the side face of the cabinet 2. That is, the flexible board 5 is attached directly to inside of the cabinet 2 without interposing the heat conducting plate 10. The flexible board 5 is attached thereto by using an adhering agent having a high heat conductivity and an attaching portion 34 on the flexible board 5 is adhered to the side face of the cabinet.

Further, a sectional shape of a reflector 32 provided to incorporate the respective point light sources 4 is constituted by a channel-like shape and the refracting device 7 is held by both end portions thereof. A side light portion 31 is constituted by the reflector 32, and a light source unit 33 comprising the respective light sources 4 and the flexible board 5. Further, the end portion 5a of the flexible board 5 on the side opposed to the side of the point light source 4 is gradually flexed along an inner wall of the cabinet 2 and flexed to the rear face 2b of the cabinet to reach the back side of the end portion 6b of the reflecting plate 6.

Also according to the embodiment, the end portion 5a of the flexible board 5 is flexed to the back side of the end portion 6b of the reflecting plate and therefore, even when the wiring pattern 21 on the flexible board 5 is complicated and the area of the board is increased, the side light portion 11 can be restrained from being enlarged.

Further, also according to the embodiment, the heat conducting plate 10 smaller than the flexible board 5 may be provided at a face of the flexible board 5 on a side opposed to a face of arranging the respective light sources 4 similar to Embodiment 1. The light source unit 20 has a rigidity by attaching the heat conducting plate 10 to the flexible board 5 and therefore, attachment or exchange (interchange) of the light source unit 20 can be facilitated without deteriorating heat radiating function. Further, the heat conducting plate 10 is made to be smaller than the flexible board 5 and therefore, the end portion 5a of the flexible board 5 can be flexed to the back side of the end portion 6b of the reflecting plate and therefore, even when the wiring pattern 21 on the flexible board 5 is complicated and the area of the board is increased, the side light portion 11 can be restrained from being enlarged.

What is claimed is:

1. A planar light source apparatus comprising:
a diffusing plate provided at an opening portion of a cabinet;
a plurality of point light sources provided along a hollow region formed on a side of a rear face of the diffusing plate;
a reflecting plate provided at inside of the cabinet by interposing the hollow region relative to the diffusing plate and arranging an end portion thereof on a side of the point light source to be inclined to a front side; and
a flexible board provided with a wiring pattern for supplying power to the respective point light sources;
wherein the flexible board is arranged at inside of the cabinet by flexing a portion thereof to a back side of an end portion of the reflecting plate.

2. The planar light source apparatus according to claim 1, further comprising:
a heat conducting plate for conducting heat produced in accordance with light emittance of the point light source to the cabinet;
wherein the conducting plate is smaller than the flexible board and provided on a side of the point light source of the flexible board; and
wherein the flexible board is arranged at a rear face of the cabinet by interposing the heat conducting plate therebetween.

3. The planar light source apparatus according to claim 1, wherein the flexible board is arranged at a side face of the cabinet provided with the respective point light sources and one end thereof is flexed to the back side of the reflecting plate.

4. The planar light source apparatus according to claim 3, further comprising:
a heat conducing plate for conducting heat produced in accordance with light emittance of the point light source to the cabinet;
wherein the heat conducting plate is smaller than the flexible board and provided on a side of the point light source of the flexible board; and
wherein the flexible board is arranged at the side face of the cabinet via the heat conducing plate.

5. The planar light source apparatus according to claim 2, wherein the respective point light sources are brought into contact with the heat conducting plate via a through hole penetrating the flexible board.

6. The planar light source apparatus according to claim 1, wherein the wiring pattern comprises a wiring for grouping the respective point light sources, connecting the respective light sources in a group in series and supplying power to the respective groups.

7. The planar light source apparatus according to claim 1, wherein an end portion of the flexible board is drawn out from a draw out hole for drawing out the board provided at a rear face of the cabinet to a side of a rear face thereof.

8. The planar light source apparatus according to claim 7, wherein the end portion of the flexible board is drawn out to the side of the rear face at a position before a position at which the reflecting plate is the remotest from the opening portion.

9. The planar light source apparatus according to claim 1, further comprising
a refracting device for refracting light from the point light source to a side of the reflecting plate to emit to the hollow region.

10. The planar light source apparatus according to claim 9, wherein the refracting device refracts light having an angle of incidence maximizing an intensity thereof in light incident on an incident face to a side of the reflecting plate.

11. The planar light source apparatus according to claim 9, wherein the refracting device emits light having an angle of incidence maximizing an intensity thereof in light incident on an incident face to the reflecting plate.

12. A liquid crystal display apparatus including a liquid crystal panel, and a planar light source apparatus for irradiating light to a rear face of the liquid crystal panel, characterized in that the planar light source apparatus comprising:
a diffusing plate provided at an opening portion of a cabinet;
a plurality of point light sources provided along a hollow region formed on a side of a rear face of the diffusing plate;
a reflecting plate provided at inside of the cabinet by interposing the hollow region relative to the diffusing plate and arranging an end portion thereof on a side of the point light source to be inclined to a front side; and
a flexible board provided with a wiring pattern for supplying power to the respective point light sources;
wherein the flexible board is arranged at inside of the cabinet by flexing a portion thereof to a back side of an end portion of the reflecting plate.

* * * * *